United States Patent
Zhu

(10) Patent No.: US 8,939,426 B2
(45) Date of Patent: Jan. 27, 2015

(54) VEHICLE CARRIER DISK

(75) Inventor: Jianhua Zhu, Ningbo (CN)

(73) Assignee: Ningbo Bangda Intelligent Parking System Co., Ltd., Ningbo (CN)

( * ) Notice: Subject to any disclaimer, the term of this patent is extended or adjusted under 35 U.S.C. 154(b) by 200 days.

(21) Appl. No.: 13/807,838

(22) PCT Filed: Aug. 30, 2010

(86) PCT No.: PCT/CN2010/001309
§ 371 (c)(1),
(2), (4) Date: Feb. 13, 2013

(87) PCT Pub. No.: WO2012/003605
PCT Pub. Date: Jan. 12, 2012

(65) Prior Publication Data
US 2013/0134290 A1 May 30, 2013

(30) Foreign Application Priority Data
Jul. 9, 2010 (CN) .......................... 2010 1 0226900

(51) Int. Cl.
*F16M 11/20* (2006.01)
*E04H 6/22* (2006.01)

(52) U.S. Cl.
CPC .............. *F16M 11/20* (2013.01); *E04H 6/225* (2013.01)
USPC ................ 248/676; 248/678; 414/227; 410/3

(58) Field of Classification Search
CPC .. B65D 2585/6867; B65D 85/68; B61D 3/18; B65G 2201/0294; B65G 69/003
USPC ................ 248/676, 678, 580, 581, 235, 250; 410/3, 4, 7, 8; 182/150; 414/227, 228
See application file for complete search history.

(56) References Cited

U.S. PATENT DOCUMENTS

| | | | | |
|---|---|---|---|---|
| 4,209,276 A | * | 6/1980 | Rosen | 414/240 |
| 4,556,126 A | * | 12/1985 | Wait | 182/150 |
| 5,286,149 A | * | 2/1994 | Seay et al. | 410/26 |
| 5,505,573 A | * | 4/1996 | Han | 414/254 |
| 5,690,462 A | * | 11/1997 | Fan et al. | 414/228 |
| 7,918,631 B2 | * | 4/2011 | Overbye | 410/4 |
| 2013/0097960 A1 | * | 4/2013 | Zhu | 52/653.1 |

* cited by examiner

*Primary Examiner* — Steven Marsh
(74) *Attorney, Agent, or Firm* — Wang Law Firm, Inc.; Li K. Wang; Stephen Hsu

(57) ABSTRACT

A vehicle carrier having a bottom frame which is composed of a left beam, a right beam and a bridging beam, characterized in that: the vehicle carrier further has an accessorial frame. A first vehicle plate is laid between the accessorial frame and the left beam, while a second vehicle plate is laid between the accessorial frame and the right beam. Compared with the prior art, in the present invention, the accessorial frame is disposed on the bottom frame, and the span length of the vehicle plate is smaller, so the material used for manufacturing the vehicle plate can be thin. Therefore, in the present invention, the materials can be significantly saved and the cost can be reduced, moreover, it can avoid the vehicles shifting on the direction when the vehicles enter into the vehicle carrier to ensure that the vehicles park in the right position.

5 Claims, 5 Drawing Sheets

VEHICLE CARRIER DISK

CROSS REFERENCE TO RELATED APPLICATION

The present application is a PCT application No. PCT/CN2010/002164 entering the U.S.A. national stage and claiming the priority of the Chinese patent application No. 201020244529.5 filed on Jun. 28, 2010.

FIELD OF THE INVENTION

The present invention relates to a vehicle carrier used in the three-dimensional parking garage, which can be applied in a transversely moving mode, and also can be applied in a vertically lifting mode.

DESCRIPTION OF THE PRIOR ART

The existing vehicle carrier in the three-dimensional parking garage mostly use frame construction, which comprises a left beam, a right beam disposed in parallel to the left beam, a bridging beam disposed between the left beam and the right beam, and an integral vehicle plate lied between the left beam and the right beam, on which the vehicle just parked. However, the existing vehicle carrier has the disadvantage that, as the vehicle plate where the vehicle is parked locates between the left beam and the right beam, the vehicle plate is of a great span length. Therefore, the vehicle plate shall be made of thick materials, commonly, the vehicle plate uses a steel plate with 2 mm thickness. It leads to high material consumption and rising cost.

For solving the problem of the over thick of the vehicle plate, a Chinese Utility Model CN201013088Y (Patent No. ZL20072001846.3) titled The Lower Vehicle Carrier for Three-dimensional Parking Equipment discloses a vehicle carrier, which comprises a platform and two longitudinal beams disposed on each side of the platform. The front and rear ends of the platform are separately equipped with a driven wheel and a driving wheel, and the platform comprises a plurality of bridging beams paralleled to each one. Both ends of the cross beam is fixedly connected with the longitudinal beam on both sides of the platform and the bridging beams are perpendicular to the side longitudinal beams. In the patent, the main raw material just uses the formed steel with a C-shaped cross section, commonly seen and readily available in the market, which apart from substantially reducing the purchasing cost of raw materials, decreases the weight and increases the bearing capacity as well. Though the weight of the vehicle plate is decreased to some degree in this patent by adopting the formed steel with a C-shaped cross section as the raw material of the vehicle plate (comprising a plurality of cross beams paralleled to each other), the span of the vehicle plate is still relatively great owning to the unchanged integral structure where both ends of each cross beam are respectively fixedly connected with the side longitudinal beams on both sides of the platform. To guarantee the carrying capacity, the vehicle plate shall be of a certain thickness. Moreover, when driven into a parking space in the three-dimensional parking garage, the parked vehicle is likely to deviate from the middle straight line owning to the lack of guiding beams, thus leading to inclined parking of the vehicle on the vehicle carrier and then bringing about many inconveniences during its leaving from the vehicle carrier.

SUMMARY OF THE INVENTION

It is an object of the present invention to provide a vehicle carrier with lighter weight which can not only save the materials, but also guide the vehicle to put in to the right parking position availably.

For achieving the above stated object, the vehicle carrier, comprises a bottom frame having a length and a center line, the bottom frame being composed of a left beam, a right beam substantially parallel to the left beam and a bridging beam connecting the left beam and the right beam; an accessorial frame with a left side wall and a right side wall, the accessorial frame being mounted on the bottom frame along the center line of the bottom frame substantially parallel to the left beam and the right beam; a first vehicle plate is placed between the accessorial frame and the left beam, the first vehicle plate having a left side and a right side; and a second vehicle plate is placed between the accessorial frame and the right beam, the second vehicle plate having a left side and a right side; wherein, the left side of the first vehicle plate is perpendicularly mounted to an inner wall of the left beam, the right side of the first vehicle plate is perpendicularly mounted to the left side wall of the accessorial frame, the right side of the second vehicle plate is perpendicularly mounted to an inner wall of the right beam, the left side of the second vehicle plate is perpendicularly mounted to the right side wall of the accessorial frame.

In order to improve the rigidity and intensity of the accessorial frame, the accessorial frame can preferably be in frame structure. Preferably, the accessorial frame further comprises two guiding beams, a front cross rail, and a rear cross rail, the front cross rail and the rear cross rail connecting two guiding beams, forming the accessorial frame; and a plurality of intermediate cross rails, placed between the front cross rail and the rear cross rail, connecting the two guiding beams.

In order to ensure that the accessorial frame matches with the bottom frame well when in installation, preferably, the bridging beam comprises a front bridging beam, a middle bridging beam and a rear bridging beam; the front side of the front bridging beam has a slope and both ends of the front bridging beam are respectively fixed with the front ends of the left beam and the right beam, both ends of the rear bridging beam are respectively fixed with the rear ends of the left beam and the right beam, the middle bridging beam is located in the middle of the bottom frame, and both ends of the middle bridging beam are respectively fixed with the middle of the left beam and the right beam; both two guiding beams are respectively provided with a recess with a size matching the width of the middle bridging beam located at the corresponding place of the middle bridging beam, the ends the middle bridging beam are respectively positioned in the recesses.

In order to avoid the inner side of the tires scraping the beams of the assistant beam when the vehicle enters into the parking place, the front cross rail and two guiding beams forming two joint corners, each joint corner being formed with a first inclined cutting surface and each inclined cutting surface is covered with an inner protecting seal head. The inner protecting seal head can be a plastic injection molding component, and can be directly covered on the first inclined cutting surfaces. The inner protecting seal head can protect the vehicle tires and is easy to be installed or taken down.

In order to keep the accessorial frame clean and prevent the engine oil or dust of the bottom frame contained in the vehicle parking on the upper vehicle carrier from dripping to the vehicle parking on the lower vehicle carrier through the interspace of the accessorial frame, a grease baffle is provided on the accessorial frame, and the grease baffle has a plurality of grooves. The trapeziform grooves have the function of accumulating and guiding, and the grease baffle can be cleaned conveniently with the trapeziform groove.

In order to protect the outer side of the tires in the vehicles, preferably, one second inclined cutting surface is formed at a front end of each of the left beam and the right beam, each second inclined cutting surface is covered with an outer protecting seal head. Compared with the inner protecting seal head, the outer protecting seal head can avoid the outside of the tires in the vehicles scraping the edge of the left beam or the right beam of the bottom frame when the vehicles are to put in to the parking space.

In order to balance the distortion of the vehicle carrier in the weight of the vehicles and avoid the bottom frame distortion, each of the left beam and right beam of the bottom frame is provided with a first tension mechanism, the first tension mechanism comprising a drawbar along the length of the bottom frame, two first supporting pieces mounted on either the left beam or the right beam, and two tension nuts for positioning the supporting pieces; the drawbar has two ends supported respectively by two supporting pieces, and each end of the drawbar has thread and coupled with a tension nut. By regulating the tension nut, the drawbars can be strained, then a certain distortion will occur in the beams of the bottom frame, which can just balance the distortion of the vehicle carrier in the weight of the vehicles. So the vehicle carrier can keep balance when the vehicle is moving, the accuracy of geometry, and accuracy of shape and position of the whole vehicle carrier can be ensured too.

To further improve the balance of the vehicle carrier when the vehicle is moving, preferably, a second tension mechanism is provided on the bottom of the bottom frame which is located between the middle bridging beam and the front bridging beam, the second tension mechanism comprises a first diagonal drawbar and a second diagonal drawbar relative slantways with each other, and four adjusting nuts respectively coupled on the each end of the first diagonal drawbar and the second diagonal drawbar; one end of the first diagonal drawbar and on end of the second diagonal drawbar are fixed in the middle of the front bridging beam, the other end of the first diagonal drawbar is fixed with the left beam, the other end of the second diagonal drawbar is fixed with the right beam. So the pulling of the drawbars can be adjusted the torque/moment of the adjusting nuts on the drawbars, then the distortion of the front part of the vehicle carrier can be adjusted, to insure the local rigidity and the accuracy of form and position, and prevent the vehicle carrier distorted by the stress which the vehicles carry on the front part of the vehicle carrier when the vehicles are to put in to the parking space or leave from the parking space.

Compared with the prior art, in the present invention, an accessorial frame is disposed on the bottom frame, the vehicle plates used for parking the vehicle are lied between the left or right beam of the bottom frame and the accessorial frame, and the span length of the vehicle plate is shorter. Therefore, the material used for manufacturing the vehicle plate can be thin, and the steel with 1.6 mm thickness can be used and is strong enough. Accordingly, the weight of the vehicle carrier can be reduced by a quarter of the existing vehicle carrier, the materials can be significantly saved and the costs can be greatly reduced. Moreover, the vehicle carrier comes into a whole device through the connection of the accessorial frame, the vehicle plate and the bottom frame. As the accessorial frame is located in the center of the bottom frame, the whole rigidity of the vehicle carrier is improved markedly, and the carrying capacity of the vehicle carrier is also improved. Additionally, the accessorial frame can also play a role in guiding the vehicles, that is, when the vehicles are running to the parking space, the left and right tires of the vehicles can respectively move along the both sides beams of the accessorial frame, to avoid the vehicles shifting on the direction, and ensure that the vehicles are parked in the correct orientation, and make the departure of the vehicles conveniently.

DETAILED DESCRIPTION OF THE PREFERRED EMBODIMENT

Figure 1:
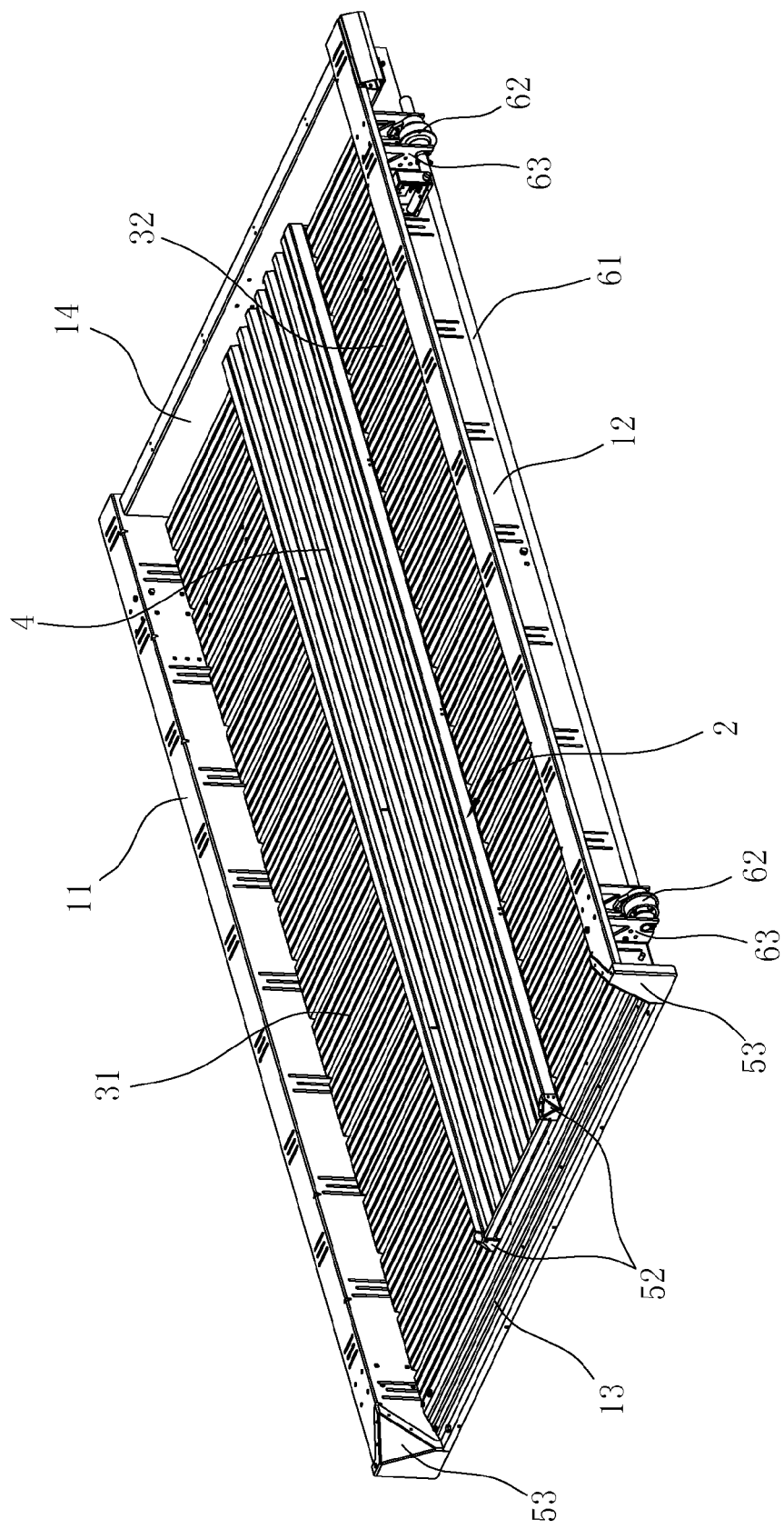
FIG. 1 is a perspective view of a vehicle carrier in accordance with an embodiment of the present invention (seen from the upside).
Figure 2:
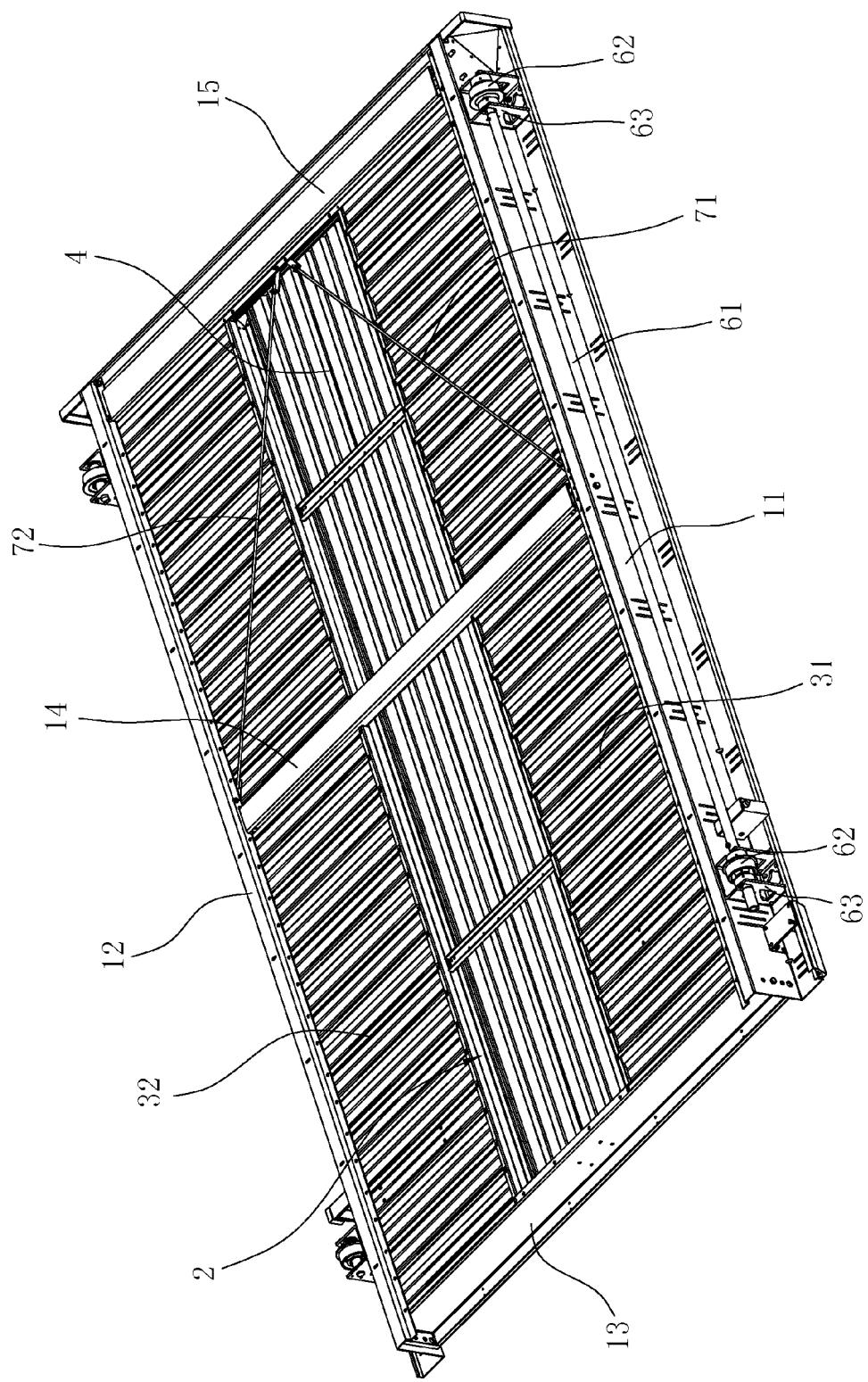
FIG. 2 is another perspective view of the vehicle carrier in accordance with the embodiment of the present invention (seen from the backside).
Figure 3:
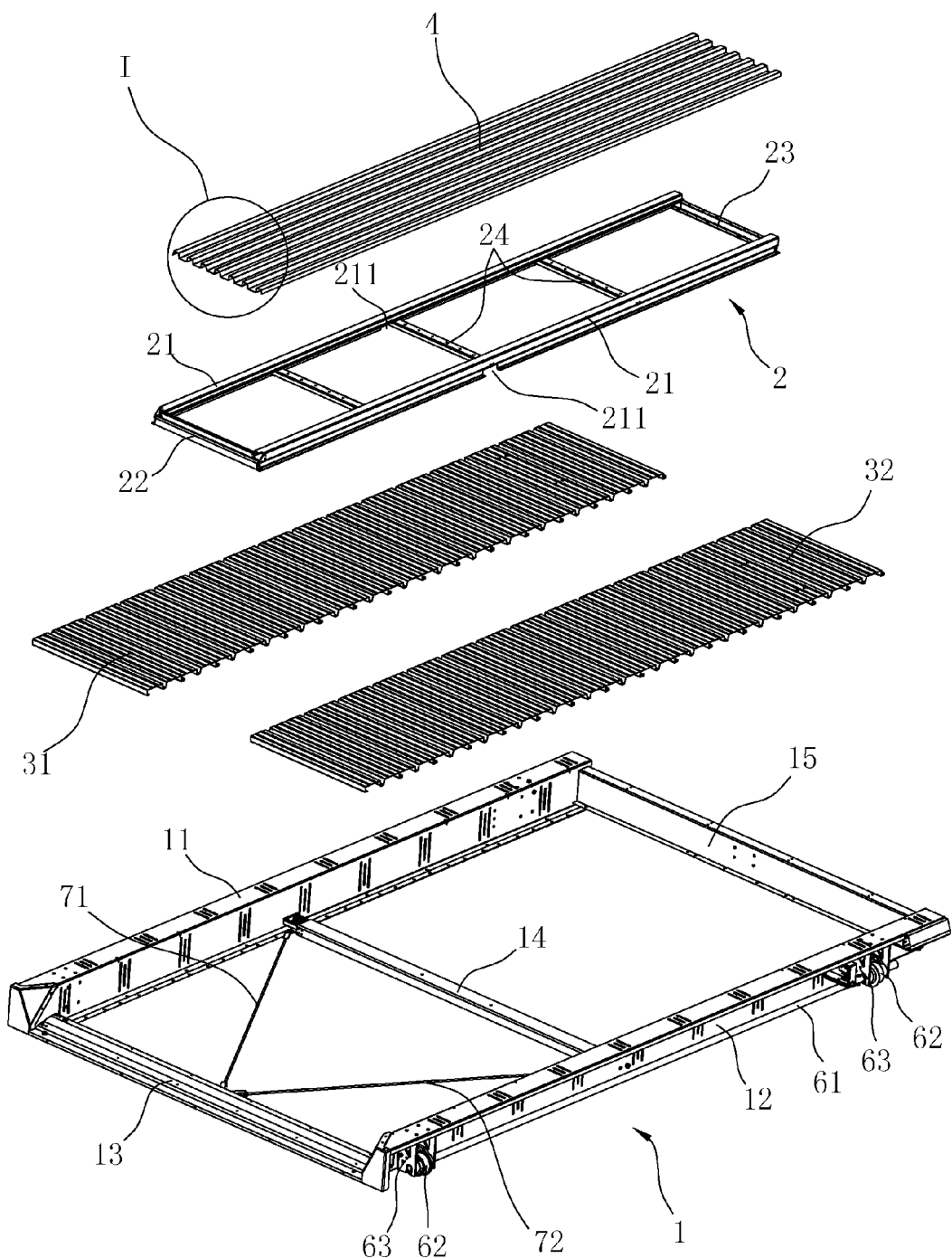
FIG. 3 is an exploded view of the vehicle carrier in accordance with the embodiment of the present invention.
Figure 4:
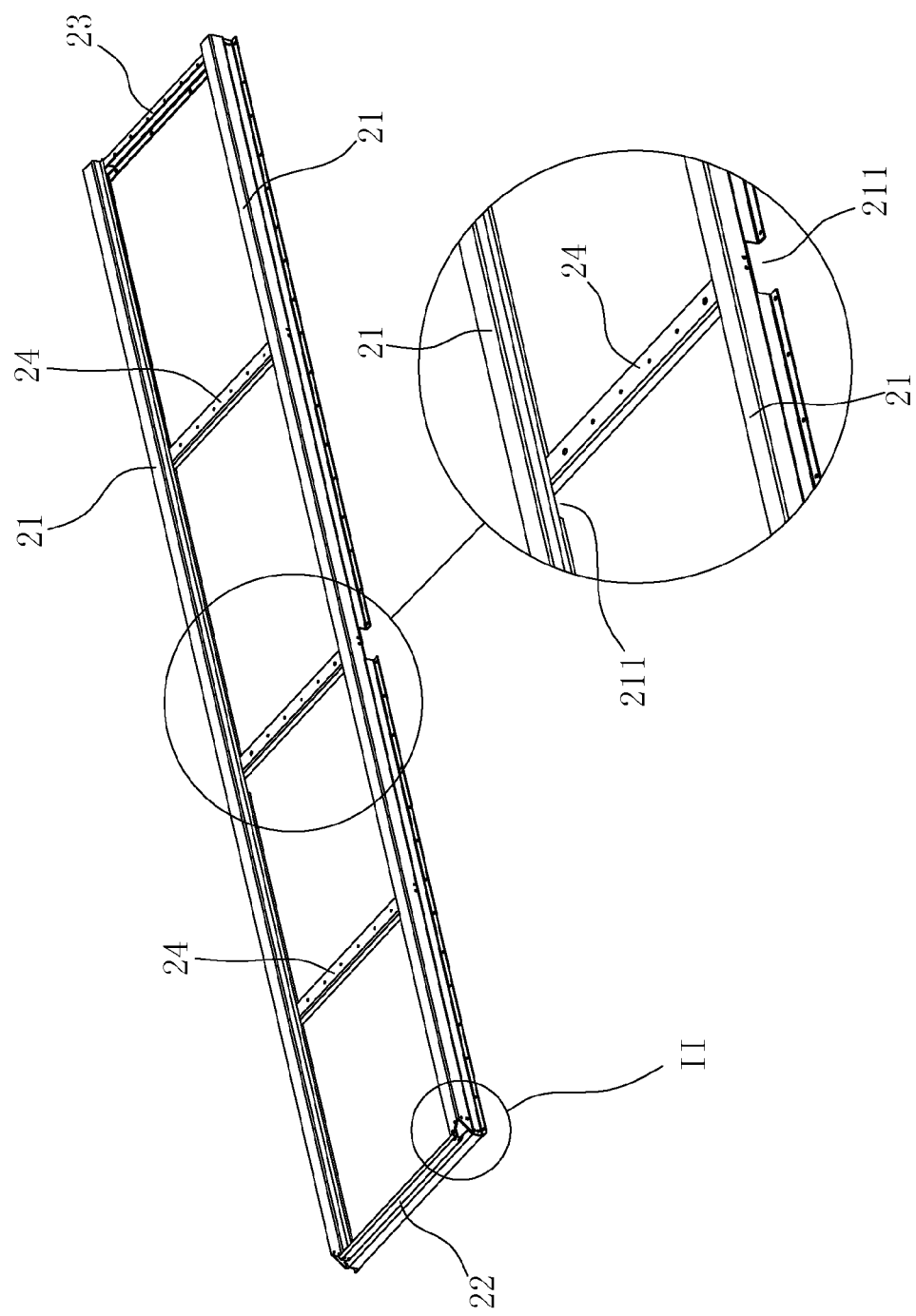
FIG. 4 is a perspective view of the accessorial frame in accordance with the embodiment of the present invention.
Figure 5:
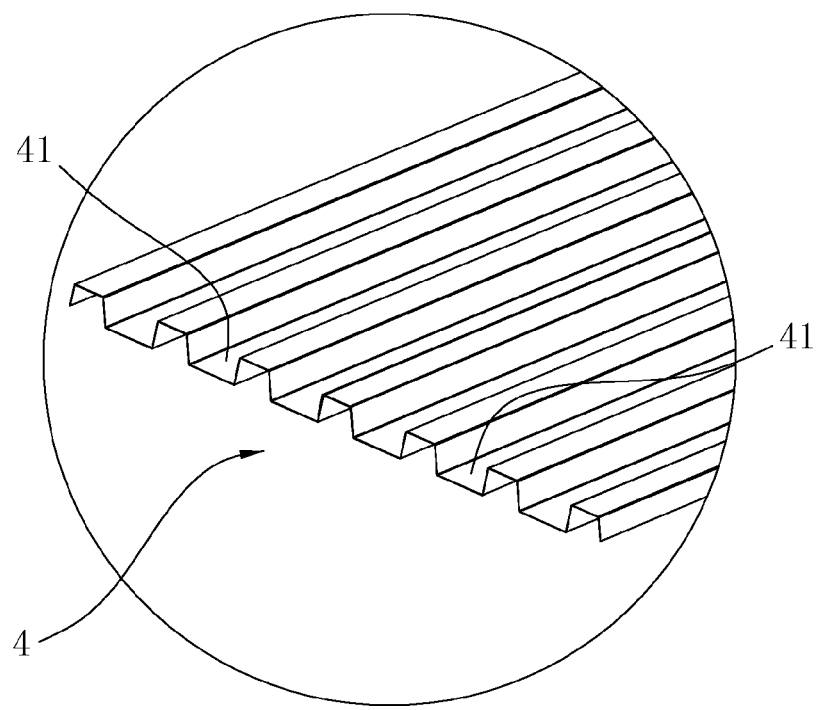
FIG. 5 is an enlarged view of the portion I shown in FIG. 3.
Figure 6:
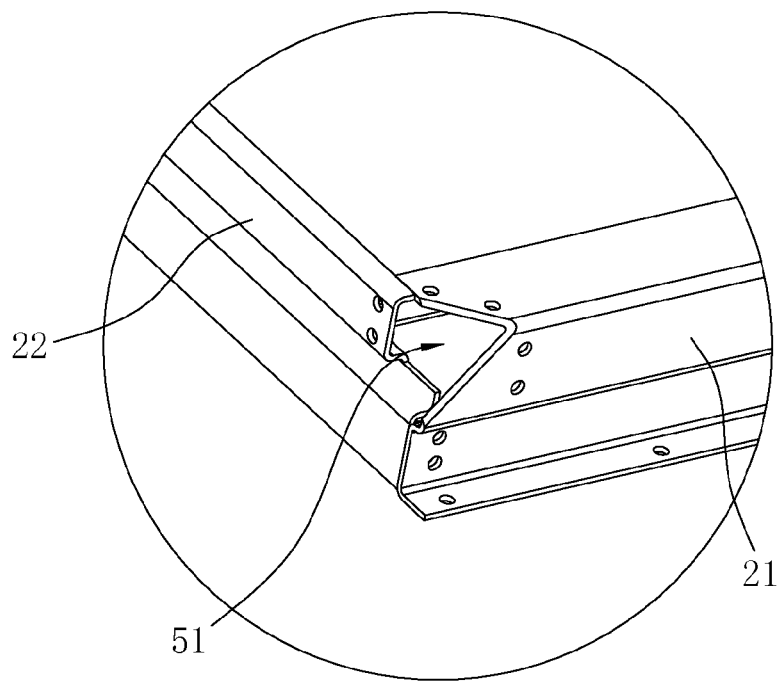
FIG. 6 is an enlarged view of the portion II shown in FIG. 4.

To enable a further understanding of the innovative and technological content of the invention herein, refer to the detailed description of the invention and the accompanying drawings below:

As shown in FIG. 1~FIG. 6, the vehicle carrier comprises a bottom frame 1, the bottom frame 1 is composed of a left beam 11, a right beam 12 substantially parallel to the left beam 11 and a bridging beam connecting the left beam 11 and the right beam 12. The bridging beam comprises a front bridging beam 13, a middle bridging beam 14 and a rear bridging beam 15, wherein the front side of the front bridging beam 13 has a slope, so that the vehicles can run along the slope when the vehicles enter into the vehicle carrier and exit from the vehicle carrier, making the movement placidly. Both ends of the front bridging beam 13 are respectively fixed with the front ends of the left beam 11 and the right beam 12, both ends of the rear bridging beam 15 are respectively fixed with the rear ends of the left beam 11 and the right beam 12, the middle bridging beam 14 is located in the middle of the bottom frame 1, and both ends of the middle bridging beam 14 are respectively fixed with the middle of the left beam 11 and the right beam 12.

A accessorial frame 2 which is mounted on the bottom frame 1 along the center line of the bottom frame 1 and fixed with the bottom frame 1 by the bolts is in a frame structure, the accessorial frame 2 further comprises two guiding beams 21, a front cross rail 22, and a rear cross rail 23, the front cross rail 22 and the rear cross rail 23 connecting two guiding beams 21, forming the accessorial frame 2. Furthermore, a plurality of intermediate cross rails 24 are placed between the front cross rail 22 and the rear cross rail 23, connecting the two guiding beams 21, and both two guiding beams 21 are respectively provided with a recess 211 with a size matching the width of the middle bridging beam 14 located at the corresponding place of the middle bridging beam 14, the ends the middle bridging beam 14 are respectively positioned in the recesses 211, so that the bottom of the accessorial frame 2 is able to be flush with the bottom of the bottom frame 1. A first vehicle plate 31 is placed between the accessorial frame 2 and the left beam 11, the first vehicle plate 31 having a left side and a right side; and the left side of the first vehicle plate 31 is perpendicularly mounted to an inner wall of the left beam 11, the right side of the first vehicle plate 31 is perpendicularly mounted to the left side wall of the accessorial frame 2. While a second vehicle plate 32 is placed between the accessorial frame 2 and the right beam 12, the second vehicle plate 32 having a left side and a right side; and the right side of the second vehicle plate 32 is perpendicularly mounted to an inner wall of the right beam 12, the left side of the second vehicle plate 32 is perpendicularly mounted to the right side wall of the accessorial frame 2. Thus, the vehicle plate for parking the vehicles is divided into two parts respectively disposed transversally between the beam and the guiding beam 21 which is relative to the said beam. After the vehicle enters into the vehicle carrier, the tires of the vehicle respectively park on the vehicle plates on both sides of the accessorial frame 2. Because the span length of the vehicle plate is smaller, the thin materials can be used in the same carrying capacity, and the 1.6 mm thick steel can be used directing. So the weight of the vehicle carrier can be abated evidently (compared with the prior art, it can be abated about a quarter), and the cost of the production is significantly lower too.

To prevent the engine oil or dust of the vehicles which park in the vehicle carrier dripping to the inside of the vehicle carrier from the interspace of the accessorial frame 2, a grease baffle 4 is provided on the accessorial frame 2, and the grease baffle 4 has a plurality of grooves 41. The trapeziform groove 41 which can be a whole or scrabbled up from some pieces has the function of accumulating and conducting, and the grease baffle 4 can be cleaned conveniently with the trapeziform groove 41.

To prevent the surface of the tires being damaged by the deams of the bottom frame 1 or the accessorial frame 2 when the vehicles enter into or exit from the vehicle carrier, the front cross rail 22 and two guiding beams 21 forming two joint corners, each joint corner being formed with a first inclined cutting surface and each inclined cutting surface 51 is covered with an inner protecting seal head 52. While one second inclined cutting surface is formed at a front end of each of the left beam 11 and the right beam 12, each second inclined cutting surface is covered with an outer protecting seal head 53.

The structure of the vehicle carrier in accordance with an embodiment of the present invention can be not only applied in the cross sliding vehicle carrier, but also applied in the lift vehicle carrier. Particularly, because of the uneven load and the acceleration of gravity in the lift process of the lift vehicle carrier, the left beam 11 and the right beam 12 will be distorted, while the distortion of the beam will make the body of the vehicle carrier be distorted wholly. To reduce the distortion and contortion of the vehicle carrier, a tension mechanism is disposed on the lift vehicle carrier.

When the lift vehicle carrier does the lifting movement, the vehicle carrier is vulnerable to the downward pressure. To avoid the vehicle carrier being distorted, each of the left beam 11 and right beam 12 of the bottom frame 1 is provided with a first tension mechanism. The first tension mechanism can provide the vehicle carrier with a pretightening force which is just balanced against the pressure that the vehicle carrier gets, thus preventing the distortion of the vehicle carrier.

The first tension mechanism comprises a drawbar 61 along the length of the bottom frame 1, two first supporting pieces 63 mounted on either the left beam 11 or the right beam 12, (the supporting pieces fix on the left beam 11 or the right beam 12 by jointing or bolt) and two tension nuts 62 for positioning the supporting pieces; the drawbar 61 has two ends supported respectively by two supporting pieces 63. Furthermore, each end of each drawbar 61 has thread and is respectively coupled with a tension nut 62 limited in the corresponding supporting pieces 63. Adjust the tension nuts 62 to let the drawbars 61 haunch-up when both ends of the drawbars 61 are pressed and press the supporting pieces 63, thereby making the beam haunch-up. When the vehicles enter into the vehicle carrier, the distortion of the vehicle carrier under the downward stress is just balanced against the upward haunch-up distortion of the beams, thus preventing the distortion of the vehicle carrier.

Taking into account that the front side of the vehicle carrier is distorted badly when the vehicles on the lift vehicle carrier enter into or exit from the vehicle carrier, and to avoid the part distortion of the vehicle carrier and improve the rigidity of the vehicle carrier, a second tension mechanism mounted on the bottom frame 1 is located in the rectangle frame structure which contains the middle bridging beam 14, the front bridging beam 13, the left beam 11 and the right beam 12. The second tension mechanism comprises a first diagonal drawbar 71 secured by two adjusting nuts and mounted between the front bridging beam 13 and the left beam 11 and a second diagonal drawbar 72 secured by two adjusting nuts and mounted between the front bridging beam 13 and the right beam 12. By adjusting the tightness of the adjusting nuts, the pull between the first diagonal drawbar 71 and the second diagonal drawbar 72 can be adjusted, so the beams of the vehicle carrier can produce a certain forced distortion which can be balanced against the distortion of the stressed vehicle carrier, to ensure the local rigidity and the accuracy of form and position, keep the vehicles in a balanced condition during the lifting process, and improve the safety of the operation and the service life of the vehicle carrier.

In the present embodiment, the accessorial frame 2 is disposed in the bottom frame 1, and the vehicle plates is laid between the accessorial frame 2 and the beam. The whole structure which contains the left beam 11, the right beam 12, the assistant beam 2, the bottom beam 1 and the grease baffle 4 not only reduces the span length of the vehicle plate, saves the materials, and reduces the weight and the cost, but also significantly improves the wholly rigidity of the vehicle carrier. Furthermore, the assistant beam 2 itself can also play a role in guiding, so when the vehicles enter into the vehicle carrier, both sides tires of the vehicles go along the guiding beams 21 of the assistant beam 2 to ensure the moving direction of the vehicles, and avoid the vehicles shifting on the parking direction, as well as make the movement convenient when the vehicles exit from the vehicle carrier again, thus make the parking easier and provincial.

The invention claimed is:
1. A vehicle carrier, comprising:
a bottom frame having a length and a center line, the bottom frame being composed of a left beam, a right beam substantially parallel to the left beam and a bridging beam connecting the left beam and the right beam;
an accessorial frame with a left side wall and a right side wall, the accessorial frame being mounted on the bottom frame along the center line of the bottom frame substantially parallel to the left beam and the right beam;
a first vehicle plate is placed between the accessorial frame and the left beam, the first vehicle plate having a left side and a right side; and a second vehicle plate is placed between the accessorial frame and the right beam, the second vehicle plate having a left side and a right side;
wherein,
the left side of the first vehicle plate is perpendicularly mounted to an inner wall of the left beam, the right side of the first vehicle plate is perpendicularly mounted to the left side wall of the accessorial frame, the right side of the second vehicle plate is perpendicularly mounted to an inner wall of the right beam, the left side of the second vehicle plate is perpendicularly mounted to the right side wall of the accessorial frame, a grease baffle is provided on the accessorial frame, and the grease baffle has a plurality of grooves, one second inclined cutting surface is formed at a front end of each of the left beam and the right beam, each second inclined cutting surface is covered with an outer protecting seal head, each of the left beam and right beam of the bottom frame is provided with a first tension mechanism, the first tension mechanism comprising a drawbar along a length of the bottom frame, two first supporting pieces mounted on either the left beam or the right beam, and two tension nuts for positioning the supporting pieces, the drawbar has two ends supported respectively by two supporting pieces, and each end of the drawbar has thread and coupled with a tension nut.

2. The vehicle carrier of claim 1, wherein the accessorial frame further comprises two guiding beams, a front cross rail, and a rear cross rail, the front cross rail and the rear cross rail connecting two guiding beams, forming the accessorial frame; and a plurality of intermediate cross rails, placed between the front cross rail and the rear cross rail, connecting the two guiding beams.

3. The vehicle carrier of claim 2, wherein the bottom frame comprises a front bridging beam, a middle bridging beam, and a rear bridging beam;

the front side of the front bridging beam has a slope and both ends of the front bridging beam are respectively fixed with the front ends of the left beam and the right beam, both ends of the rear bridging beam are respectively fixed with the rear ends of the left beam and the right beam, the middle bridging beam is located in the middle of the bottom frame, and both ends of the middle bridging beam are respectively fixed with the middle of the left beam and the right beam;

both two guiding beams are respectively provided with a recess with a size matching the width of the middle bridging beam located at the corresponding place of the middle bridging beam, the ends the middle bridging beam are respectively positioned in the recesses.

4. The vehicle carrier of claim 2, wherein the front cross rail and two guiding beams forming two joint corners, each joint corner being formed with a first inclined cutting surface and each inclined cutting surface is covered with an inner protecting seal head.

5. The vehicle carrier of claim 1, wherein a second tension mechanism is mounted on the bottom frame, the second tension mechanism comprises a first diagonal drawbar secured by two adjusting nuts and mounted between a front bridging beam and the left beam and a second diagonal drawbar secured by two adjusting nuts and mounted between the front bridging beam and the right beam.

* * * * *